United States Patent [19]

Miller et al.

[11] 4,414,593
[45] Nov. 8, 1983

[54] STREAMING CARTRIDGE TAPE DRIVE

[75] Inventors: William R. Miller; Jones V. Howell, both of Costa Mesa, Calif.

[73] Assignee: Archive Corporation, Costa Mesa, Calif.

[21] Appl. No.: 309,573

[22] Filed: Oct. 8, 1981

[51] Int. Cl.³ .................. G11B 21/08; G11B 5/56; G11B 5/58; G11B 21/24
[52] U.S. Cl. ........................ 360/102; 360/71; 360/78; 360/109; 360/75
[58] Field of Search ............. 360/102, 106, 96.1, 360/96.4, 74.6, 103, 78, 109

[56] References Cited

U.S. PATENT DOCUMENTS

| T915,016 | 10/1973 | Chow et al. | 360/102 |
|---|---|---|---|
| 3,573,769 | 4/1971 | Flora | 360/102 |
| 3,643,037 | 2/1972 | Norwood | 360/102 |
| 3,781,490 | 12/1973 | Phillips | 360/71 |
| 3,861,619 | 1/1975 | Wolff | 360/74.6 |
| 4,237,497 | 12/1980 | Trevithick | 360/74.1 |
| 4,270,153 | 5/1981 | Bejerano et al. | 360/78 |
| 4,333,116 | 6/1982 | Schoettle | 360/78 |

Primary Examiner—Alfred H. Eddleman
Attorney, Agent, or Firm—George F. Bethel; Patience K. Bethel

[57] ABSTRACT

The following specification discloses a streaming cartridge tape drive, wherein magnetic tape in a cartridge is driven over a magnetic head for purposes of recording and reading information magnetically on the tape. The information is written onto the tape and subsequently read and checked in a continuous streaming manner to assure the correctness thereof. The tape is driven over the first channel of the head in one direction wherein a write and read head on one portion of the tape effectively writes and reads the information imparted thereto. The tape is returned in the other direction over a second channel of the write and read head which respectively writes and reads the information on the tape as it passes thereover in its return direction. Subsequent thereto, the head is moved laterally across the face of the tape to provide for a third and fourth channel, or track, being respectively written and read in the same manner as the previous first and second channels, thereby providing four serpentine tracks. The head, when moving across the face of the tape, is provided with an air cushion so as to avoid tearing, laceration, or attendant damage to the tape surface. This is accomplished when the tape has reached its terminal or stopping point by oscillating the tape over the head by the drive system and logic of the drive control circuit. In the alternative, when the tape is moving, at the beginning or the end of the tape, the head is moved laterally only at the time when the tape is still moving but is no longer being written upon and having information read therefrom in a usual manner. Accordingly, the entire device provides for longer tape life, less damage, as well as substantially precluding tearing and degradation of the magnetic properties thereof.

21 Claims, 6 Drawing Figures

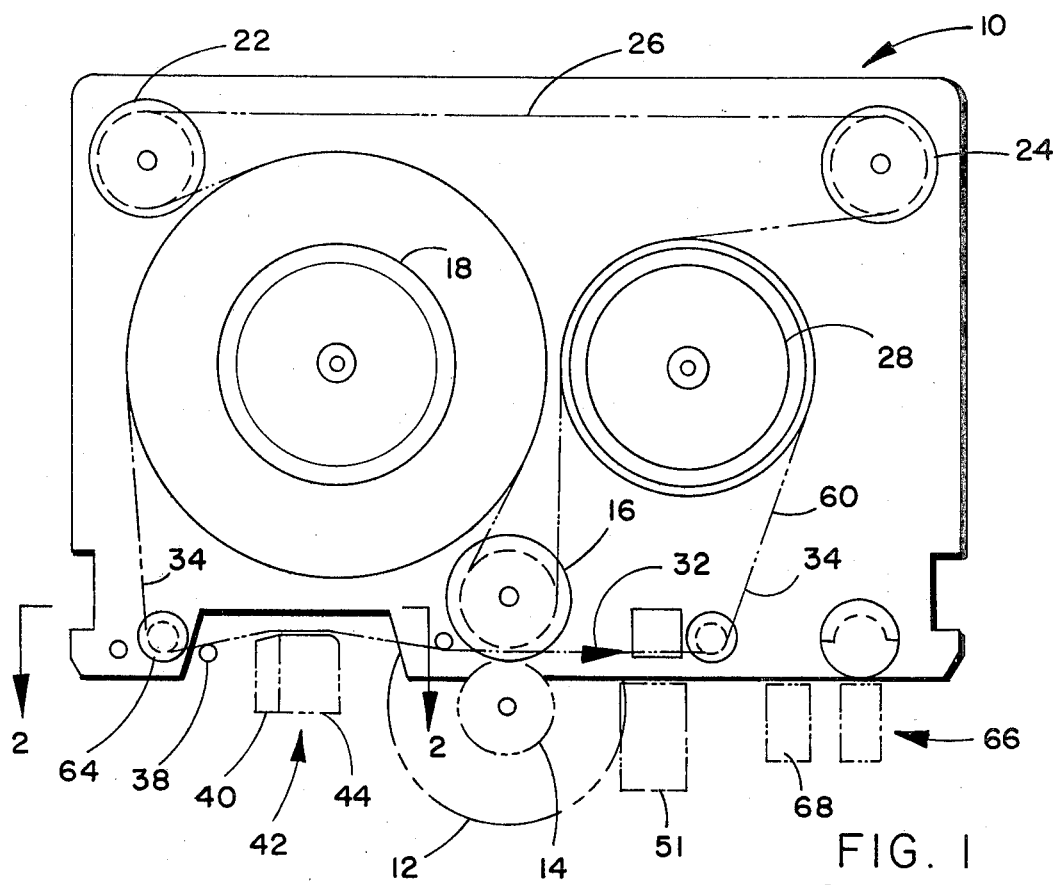
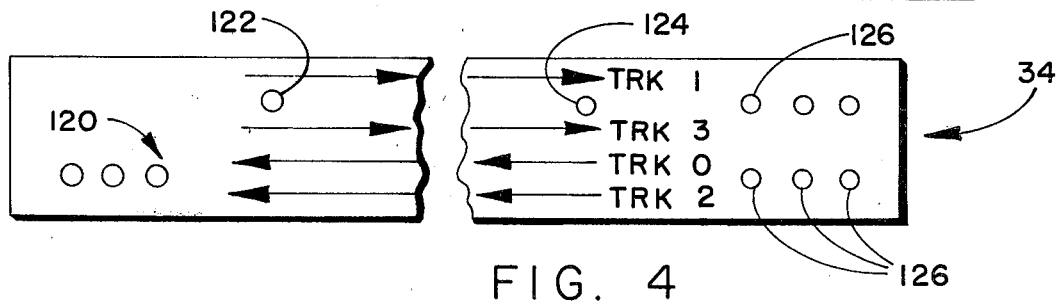
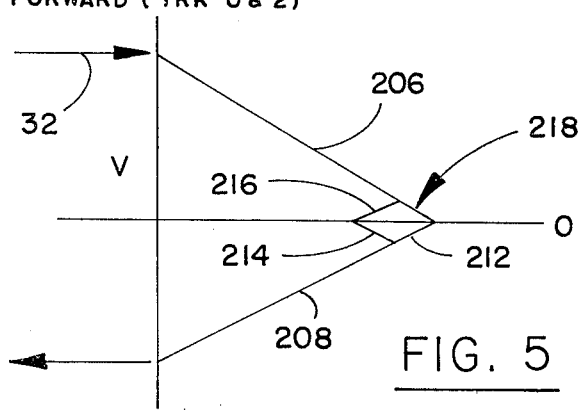
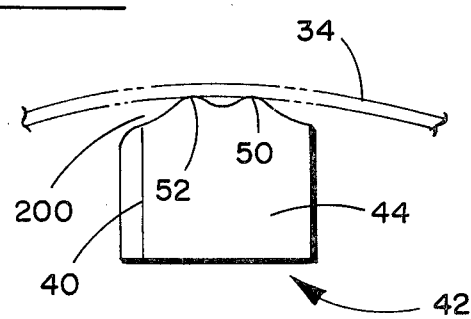

STREAMING CARTRIDGE TAPE DRIVE

FIELD OF THE INVENTION

The field of this invention lies within the magnetic tape art. More importantly, it lies within the streaming magnetic tape cartridge art, wherein information is continuously imparted to a tape by writing on the tape and in some cases, reading and validating the veracity of the information being written thereon.

BACKGROUND OF THE INVENTION

The background of this invention lies within the streaming cartridge tape art wherein information can be recorded at a density of eight thousand bits per inch. The tape drive incorporates a micro-computer which controls various drive functions and interfaces with a host system.

The streaming cartridge is particularly useful by virtue of the fact that in conventional tape systems, the recorded data is blocked and can be individually accessed and updated. To preserve the individuality of each record, the tape system must start and stop between records.

The foregoing requirement necessitates the incorporation of fairly long inter-record gaps. The length of the gaps is such that a conventional tape might only use approximately twenty percent of the magnetic media. This, of course, is a substantial detriment, inasmuch as the recordation and utilization of the tape is quite inefficient.

A streaming tape format can be approximately ninety seven percent efficient, due to the fact that the tape is not started and stopped over an extended period of time. The reason for this is that the typical start and stop format of a regular tape drive provides for certain inter-block gaps, and data fields that are interspersed between the interblock gaps. In addition thereto, the address and the synchronous requirements are much less with regard to the streaming format.

In effect, the streaming tape system provides maximum tape utilization at a high throughput rate for those applications that do not require tape systems that access and update individual records.

Streaming tape systems, as do many other tape systems, use a read after write technique to verify the recorded data shortly after it is written. In the conventional tape system when a read after write error is detected, the tape is stopped, backed up, and rewritten. Forward creep, a feature of most conventional tape systems causes the rewritten record to be displaced in the forward direction from the previous position of the record. This, therefore, causes the inner record of the gap to be lengthened by each successive application of backups.

In a streaming system, the particular block in error is simply rewritten until no read after write errors are detected. Therefoe, short block lengths provide better tape utilization than long block lengths for streaming systems.

The streaming system can utilize a serpentine recording technique wherein the first pass is over a write and read head along a first or zero channel or track. The second track is obtained by reversing the tape direction and reading or writing with a second channel of the head, with the head body and tape in the initial relative position. On the return, the head, or in some cases the tape itself, can be moved to provide for a passage of the third or fourth tracks or channels in the same manner as the first and second.

Regardless of the foregoing, the movement of the head body relative to the tape is a necessary requirement in order to record and read various tracks or channels of the tape. To do this, in the prior art, it was oftentimes necessary to use a number of various difficult and complex methods to prevent the tearing of the tape.

The invention herein eliminates the complex methods of the prior art and incorporates a unique method and apparatus for moving the head across the tape without degradation, oxide deterioration, and in the worst case, tearing or wrinkling of the tape.

This is accomplished by maintaining an air gap, an air cushion, or an air bearing over the surface of the head as it is moved across the tape.

To do this, the head is moved laterally while the tape is moving at the beginning or toward the end of the tape when no information is to be written or read. In the alternative, when the tape is stopped, at the end of the tape, beginning of the tape, or possibly at the middle of the tape, the capstan or drive is oscillated by pulsing the motor backwardly and forwardly to provide an air cushion between the tape and the head to prevent the lateral drag of the head as it moves across the tape.

Regardless of whether the tape is a streaming cartridge tape, a cartridge using the start-stop format, or a one half inch, one inch, or any size type of tape or paper tape, the invention effectively provides for smooth transitional movement of the head across the tape through the air cushion technique of this invention.

As will be seen in the subsequent description of the preferred embodiments and the claims attendant therewith, this invention is a substantial step over the prior art in allowing tape cartridges to be utilized and used with heads that move laterally across the face thereof. The invention applies equally well to any other form of tape drive or similar mechanism where a read/write head or equivalent must be moved across the surface of the tape.

SUMMARY OF THE INVENTION

In summation, this invention comprises a streaming tape cartridge drive with a write-read magnetic head that moves across the tape to provide for multiple channels or tracks for writing and reading information thereon, and is enhanced by an air cushion between the head and the tape when the head is being moved.

More particularly, the invention incorporates techniques for tape drives having a cartridge wherein the tape is driven by a capstan over a magnetic head. The magnetic head incorporates multiple write and read functions that allow the information to be entered onto the tape and read therefrom in a manner to verify the accuracy thereof. The tape drive is controlled by a micro-computer that is in turn interfaced with a host system. The motor is controlled by the micro-computer and a power amplifier for driving the motor connected to the capstan that is in turn controlled by a digital tachometer that feeds information back into the micro-computer.

The head, with the write and read function, in its housing is attached to a lead screw that is rotated by a stepper motor. The stepper motor is controlled by a four phase amplifier emitting pulses to provide for movement of the stepper motor for moving the head across the face of the tape.

The micro-computer when moving the head across the tape, provides for the fact that the tape is always moving across the face of the head in either an oscillatory or unidirectional manner. In addition, the tape is moved either toward the end of its movement, or toward the beginning of its movement across the head so as to provide an air cushion interface while the head is moved laterally across its face without degradation of the tape.

DESCRIPTION OF THE DRAWINGS

The invention will be more clearly understood by reference to the description below taken in conjunction with the accompanying drawings wherein:

FIG. 1 shows a plan view of the streaming cartridge tape drive of this invention as to the mechanical elements thereof;

FIG. 3 shows a view looking downwardly at the tape passing over the head in the direction of lines 3—3 of FIG. 2;

FIG. 4 shows a diagramatic view of the tracks on the tape;

FIG. 5 shows a graph of tape movement with respect to velocity; and,

DESCRIPTION OF THE PREFERRED EMBODIMENTS

Figures 2, 6:
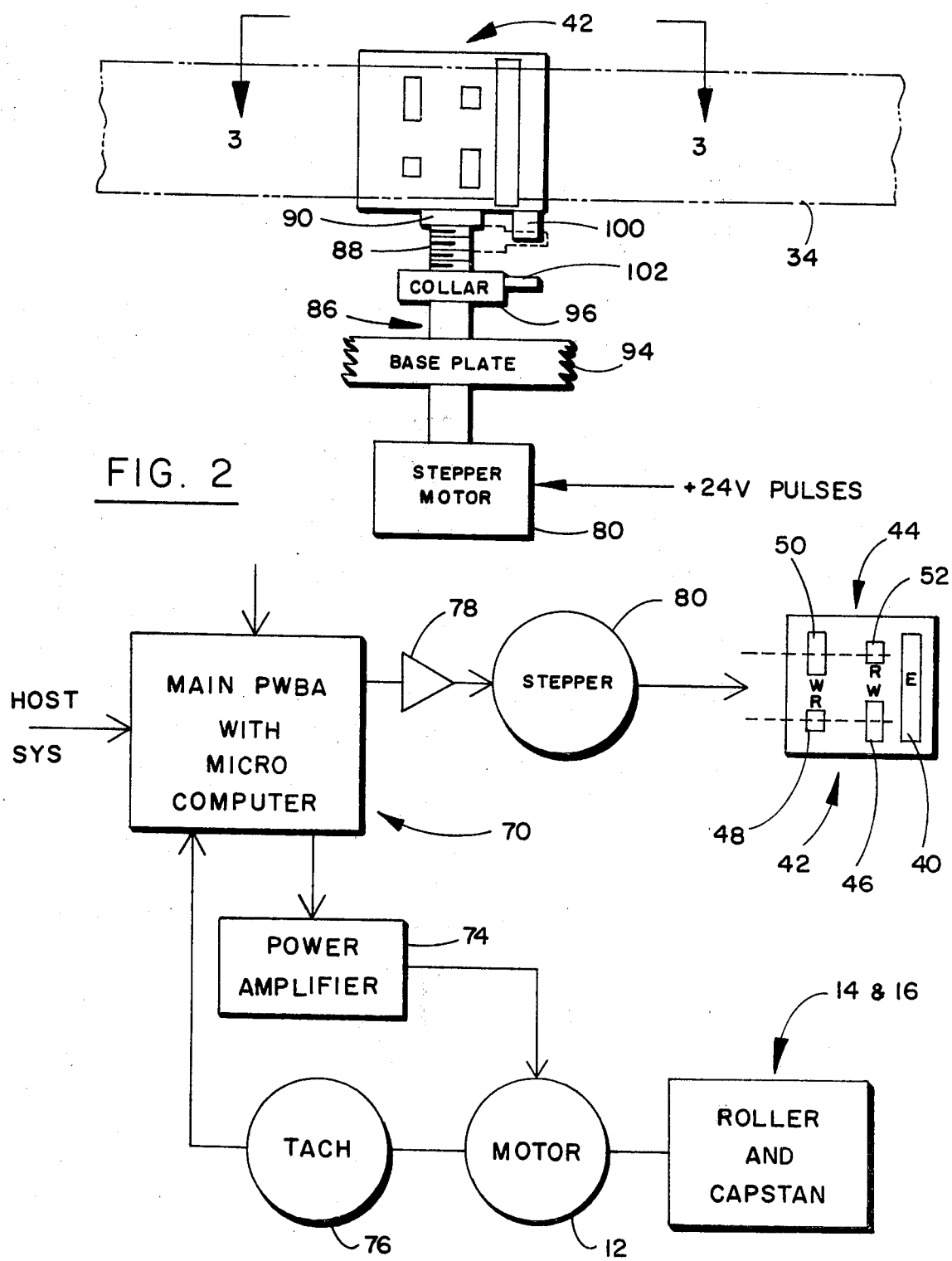
FIG. 2 shows a view looking at the magnetic head, with the tape moving thereover and the support and drive system for the head in the direction of lines 2—2 of FIG. 1.
FIG. 6 shows a schematic view of the control elements of the cartridge drive in block form.

Looking more specifically at FIG. 1, it can be seen that a cartridge chassis 10 is shown supporting the different elements necessary for providing a tape drive movement. The tape drive movement is driven by a drive motor 12 that is connected to a drive roller 14. The drive roller 14 in turn provides movement to a belt capstan or roller generally described hereinafter as a capstan 16.

The language "capstan" in reference to this application will be referred to as generally a device which provides movement to the tape on a rotational basis and can be connected to a drive means, such as the drive motor.

The tape is provided from a supply hub 18. The tape is wound on the supply hub and is shown toward the beginning of tape position.

A pair of belt guide rollers 22 and 24 are shown for purposes of providing the necessary drag and guidance for the flat drive belt 26.

A takeup hub 28 in conjunction therewith, receives the tape around its surface as it is coiled thereabout. The supply and takeup reel functions interchange when the tape is driven in the reverse direction.

The guide belt 26 fundamentally serves the function of rotating the supply hub and the takeup hub for rotational movement in the direction of the forward tape motion which is shown as arrow 32. Arrow 32 shows a tape 34 moving in the direction of the arrow for takeup on the takeup hub 28.

The tape 34 in its initial movement, moves across an integral tape cleaner 38 before it moves across an erase bar portion 40 of the magnetic head generally shown as magnetic head 42. The magnetic head 42 has a read-write head portion 44 forming a portion thereof for respectively reading and writing or writing and reading as it moves across the face thereof.

In order to detect the movement of the tape when it is toward the end of its movement or at the beginning of its movement, a number of holes are provided which are shown by FIG. 4. The means for sensing the holes are provided by a tape hole sensor or port 51 to determine when the holes are passing.

In order to determine the orientation of the tape 34, it should be understood that the tape's oxide surface is on the outside at certain portions after it passes over the head 42. The oxide exposed side is shown as side 60 of tape 34 after it has passed over one of two fixed tape guides, namely, the last of the two fixed tape guides 62. The first of the two tape guides is shown as tape guide 64 which passes the tape 34 thereabout before the tape is cleaned by the integral tape cleaner 38.

A "safe" switch 66 and a file protect function is provided along with means for detecting when a cartridge is implaced by a cartridge inplace switch 68.

As can be seen, the oxide surface 60 moves across the tape head 42 in a manner which provides for axial passage of the tape 34 over the face of the head 42. If the head 42 is moved laterally across the tape 34, when the tape is stopped, it creates degradation, tape scratching and in the worst case, tearing of the tape 34 or destruction of the oxide surface. To overcome this, the applicant has provided for an air film over the surface. This is particularly required, due to the fact that multiple tracks are utilized as can be seen in FIG. 4.

Summarily, the FIG. 4 showing indicates a serpentine movement of the tape 34, wherein the tape starts in the direction of track zero in one direction. It moves in the reverse direction in the direction of track 1. Thereafter, the head 42 moves laterally across the tape to allow the write and read portions thereof to effectively write and read on track 2 in the outgoing direction and in the incoming direction on track 3. In other words, when the tape is moving in the direction of arrow 32 initially, it moves along the direction of track zero and upon return in the opposite direction of arrow 32 it moves on track 1. Thereafter, when the head is moved laterally across the tape 34, the tape then moves in the direction of arrow 32 along track 2 and then in reverse along track 3 opposite from the direction of arrow 32.

The write-read function is provided by the read-write head 42 which is seen in FIG. 6 incorporating an erase bar 40 and a read-write portion 44. The write portion 46 of the lower portion of the head 42 is followed by a magnetic read portion 48. Thus, on track zero, and track 2, write and read portions 46 and 48 perform in a write and read manner in the respective arrow directions shown in FIG. 4. The write and read portions namely write portion 50 and read portion 52, allow for the passage of the tape thereover for a respective writing and reading function of track 1 and track 3 shown in FIG. 4.

Thus, when write and read functions are provided by respective write and read magnetic portions 46 and 48 of the magnetic head 42, they provide for the zero track moving in the direction of arrow 32 and for the first track moving opposite of the direction of arrow 32 to respectively write and read on those two respective channels.

When the head is moved laterally across the face of the tape, which can be in a downward manner as shown in FIG. 2, the respective write and read functions of elements 46 and 48 write and read on track 2 and upon the return of the tape 34, elements 50 and 52 write and read on track 3.

To describe the respective movements of the tape for providing writing and reading functions when the head 42 moves across the face, the invention with regard to the tape drive and the stepping motor for moving the head and the controls therefor will be detailed hereinafter.

Looking more particularly at FIG. 6, the block diagram shows the interface of the cartridge drive with the host system. In particular, the host system incorporates the main frame or other computing capability that is in turn interfaced with the streaming cartridge magnetic tape drive of this invention.

Fundamentally, the host command system provides the commands of select, position, write data, write file mark, read data, read file mark, and read status. The host can also be such that it has an on-line and request interface, as well as a controller stating the fact that it is ready or there is an exception. There is an eight bit data bus to provide these functions, as well as such functions as reset and correction.

All of the foregoing are interfaced with the host by means of the micro-computer which has been duly labeled as micro-computer 70. The micro-computer 70 is fundamentally one that has intelligence and creates an intelligent drive to eliminate the problems inherent within writing operations of certain prior art devices.

The system offers a read after write error sequence to determine any errors. This is done sequentially on the tape. The amplifier of the micro-computer as interfaced with the host system puts out a signal to allow the motor 12 driving the roller 14 and capstan 16 to function in the proper manner. The output of the micro-computer is interfaced to a power amplifier 74 that provides the power to the motor 12. The power amplifier 74 to the motor 12 is controlled by the micro-computer and is of a Darlington configuration. The amplifier 74 is controlled by the micro-computer in response to a digital tachometer 76 that monitors the speed of the motor 12 and the attendant speed of the capstan. The tachometer 76 is a digital tachometer that puts out a square wave to the micro-computer 70 so as to allow it to process the output in digital form.

The foregoing generally briefly describes the controller for the capstan which drives the tape 34 over the head 42.

When the tape is streaming along one of the four respective tracks, zero through 3, the head is not moved. However, toward the end of the tape at one end or the other, the head must be moved, for example, from track 1 for sequencing tracks 2 and 3. In order to do this, the amplifier 78 in conjunction with a stepper motor 80, allows the head 42 to move upwardly and downwardly.

The foregoing movement by the stepper motor 80 driven by the amplifier 78 is shown mechanically in FIG. 2. The movement of the stepper motor 80 is provided by voltage pulses, such as twenty-four volts, which serve to turn a screw 86 having threads 88. The threads 88 are threaded through a matching female nut member 90 that supports the head 42. As the screw 86 turns, it raises and lowers the head 42 so that it moves laterally across the face of the tape. This accordingly raises the respective write and read head portions 46 and 48 and the write and read head portions 50 and 52 to allow for a sequential serpentine movement of tape 34 with respect to tracks 2 and 3 being positioned in the latter and tracks 0 and 1 being positioned in the former for the respective writing and reading functions.

The screw 86 attached to the stepper motor 80 passes through a base plate 94 and allows a collar 96 that is affixed to the non-threaded portion of the screw 86 to rotate therewith. The collar 96 can be fixed by means of an Allenhead screw or other means along the screw 86.

As the screw 86 rotates, it turns the collar until it engages a stop 100 depending from the head 42. The stop 100 as can be seen, stops an appendage 102 of the collar that has been shown in its static configuration against the appendage stop 100. This allows for a bottom or end of screw movement placement. If this were not provided the stepper motor 80 would not be turning in relationship to a fixed position in order to move the head 42 upwardly or downwardly. This is due to the fact that the position of the head is not implaced in memory as to the number of pulses or steps, thereby requiring starting from a given point each time the head is moved. If this were not provided, the motor might move the head 42 too much or too little, depending upon the placement of the stepper 80 during the last stopping period.

By returning the head 42 to a stop position that is blocked by the collar 96 when the appendage 102 engages the stop 100, the stepper 80 and the head 42 can always start out at a pre-established position across the face of the tape 34.

In order to cushion the movement of the head 42 across the face of the tape 34, an air cushion is provided by this invention. This air cushion is provided in one of two manners.

In particular, as can be seen in FIG. 4 a number of holes 120 are shown. The holes 120 at the beginning and the end of the tape 34 allow for the respective indication of the beginning of the tape and the end of the tape. Warning holes 122 and 124 permit a reading by the port 51 to determine when the end of tape is to arrive. The foregoing beginning and the end of tape warning functions tell the host to stop writing data. When returning in the other direction such as a return in the direction from track zero in the direction of track 1 in the serpentine mode, the end of the tape goes from zero velocity to the proper backward velocity in the other direction. In other words, in the forward velocity mode, tracks zero and 2 are being decelerated to a zero mode starting at holes 120, while the backward mode is being decelerated at points 126 as to tracks 1 and 3.

In order to effectively move the head 42 as shown in FIG. 3 across the face of the tape, a gap or air space 200 is provided. This air cushion 200 or gap is such that it is generated during any tape movement inasmuch as the tape does not drag directly across the face of the head in its travelling mode, but is supported in some measure by a slight air cushion. This prevents oxide deterioration and provides for longevity of the tape.

Accordingly, the first method of moving the head 42 across the tape is to move the head during the deceleration mode such as during a deceleration along line 206 of the graph of FIG. 5. The other means is to move the head during the acceleration mode along line 208. These two respective modes are the end of the tape or the beginning of the tape, depending upon how the tape is running. One way or the other, the head 42 is moved across the face of the tape, while the tape is moving in its deceleration or acceleration mode.

In addition to the foregoing means for providing the air cushion, the applicants have determined that a pulsing of the motor 12 by the micro-computer 70 through the amplifier 74 can cause the capstan to move backwardly and forwardly so that an acceleration and deceleration movement in an oscillatory manner is provided in the direction of lines 212 of FIG. 5. Thus, backward pulsing and forward pulsing velocity increases can be used. In this manner, the motor 12 would be pulsed backwardly in the direction of lines 212. This allows it to accelerate from zero to a given velocity and then decelerate at line 214 to a zero velocity. A forward pulse again along line 216 provides a positive velocity which is allowed to decelerate along line 218.

This pulsing mode of the motor 12 by the micro-computer through the amplifier 84 allows for the capstan to move backwardly and forwardly and attendantly drive the tape 34 across the head 42 with an air cushion. At the same time, the micro-computer 70 provides an output through the amplifier 78 to the stepper motor 80 to drive the screw 86 in the direction desired to move the head 42. The head 42, it must be remembered, has been positioned at a particular stop by virtue of the collar 96 with the appendage 102 and the stop 100 which engages it. Accordingly, it moves to the right track as driven by the micro-computer with respect to a particular amount of pulses which cause the head 42 to move across the face in a given number of pulses to move it, as an example, from tracks zero and 1 to tracks 2 and 3 for writing and reading of the information.

In accordance with the foregoing invention, an air space 200 is constantly provided during lateral read write head 42 movement. This is done, as previously stated, by either moving the head 42 during the deceleration or acceleration of the tape at the end or the beginning of tape movement, as well as pulsing and oscillating the tape backwardly and forwardly by the motor 12 and attendantly moving the head. The foregoing velocity functions during head movement have been shown in FIG. 5 to provide the air gap or cushion and function effectively to prevent degradation, deterioration, and oxide damage to the tape.

Thus, the invention should be read broadly as to providing an air cushion and the other attendant apparatus for preventing degradation of a tape during lateral movement of a magnetic head across the tape.

We claim:

1. A tape cartridge drive having a read-write head for writing and reading information on the tape wherein said head is driven into different respective locations with respect to the tape for providing different tracks or channels for writing and reading on the tape, wherein the improvement comprises:
    means for supporting said magnetic head;
    means for moving said magnetic head across said tape in a lateral manner in order to change the location of said head with respect to said tape; and,
    means for causing said tape to move longitudinally and be provided with an air cushion between the tape and the magnetic head when said head is moved laterally across the face of said tape.

2. The tape drive as claimed in claim 1 further comprising:
    a stepper motor for driving said head across the face of said tape.

3. The tape drive as claimed in claim 1 further comprising:
    a plurality of write and read elements on said head to provide for multiple channel writing and reading on said tape when said head is moved to different portions of said tape.

4. The tape drive as claimed in claim 3 further comprising:
    control means for causing the movement of said head across the tape at the beginning of the tape movement or the end of the tape movement, or any point between the two.

5. The tape drive as claimed in claim 4 further comprising:
    means for indicating the beginning of the tape or the end of the tape.

6. The tape drive as claimed in claim 5 wherein said indication means comprise:
    holes in said tape that are sensed.

7. The tape drive as claimed in claim 1 further comprising:
    a stepper motor for moving said head having a screw connected to said head to move it upwardly and downwardly.

8. The tape drive as claimed in claim 7 further comprising:
    a stop means for said head to stop it at a fixed position with respect to the tape so that it can always move from the fixed position to the other portion across said tape.

9. The tape drive as claimed in claim 8 wherein:
    said stop comprises a collar attached to said screw connected to said tape head; and,
    said head has a stop against which said collar is engaged to prevent further rotational movement of said screw by said stepper motor.

10. The tape drive as claimed in claim 1 further comprising:
    means to oscillate said tape backwardly and forwardly when said head is moved laterally across the face of said tape.

11. The tape drive as claimed in claim 1 further comprising:
    a micro-computer to provide stepped movement to the tape drive means in a backward and forward mode to provide an air cushion while said head is moving laterally across the face of said tape.

12. The tape drive as claimed in claim 11 further comprising:
    a digital tachometer for regulating the motor driving the tape interfaced with said micro-computer.

13. The improved means for moving a magnetic head laterally across a magnetic recording tape for reading and writing with respect to said magnetic tape, driven by a motor so as to avoid degradation thereof, wherein the improvement comprises:
    a head having means for writing and reading on multiple tracks on said tape;
    means for moving said head laterally across the face of said tape; and,
    means for providing an air cushion between said tape and said head while said head is being moved laterally across said tape.

14. The improvement as claimed in claim 13 further comprising:
    means for moving said tape at the beginning or at the end of the tape to provide said air cushion while said head is being moved laterally across said tape.

15. The improvement as claimed in claim 14 further comprising:

means for oscillating the tape backwardly and forwardly across the face of the magnetic head to provide an air cushion.

16. The improvement as claimed in claim 13 further comprising:
a micro-computer for controlling said motor that drives the tape.

17. The improvement as claimed in claim 16 further comprising:
a stepper motor connected to said micro-computer through an amplifier for providing incremental stepping movement to said magnetic head.

18. The improvement as claimed in claim 17 wherein:
said stepper motor drives said head by means of a rotating screw.

19. The improvement as claimed in claim 18 further comprising:
means for returning said head to an established position before moving it to a respective position across said tape.

20. The improvement as claimed in claim 19 wherein said means for providing an established position comprises:
a collar for rotation on said screw; and,
stop means on said head so that as said collar moves on said screw said screw and head is stopped when it engages said stop means.

21. The improvement as claimed in claim 20 further comprising:
means for controlling said motor for said cartridge drive in the form of a digital tachometer interfaced between said motor and said micro-computer; and,
amplifier means connected to said micro-computer and said motor for providing the power as regulated by said micro-computer to said motor.

* * * * *